(12) United States Patent
Reiter et al.

(10) Patent No.: US 6,532,744 B1
(45) Date of Patent: Mar. 18, 2003

(54) METHOD FOR COOLING A GAS TURBINE SYSTEM AND A GAS TURBINE SYSTEM FOR PERFORMING THIS METHOD

(75) Inventors: Wilhelm Reiter, Kussaberg (DE); Hans Wettstein, Fislisbach (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/873,188

(22) Filed: Jun. 5, 2001

(30) Foreign Application Priority Data

Jun. 5, 2000 (DE) .......................................... 100 27 833

(51) Int. Cl.⁷ ................................................. F02C 6/08
(52) U.S. Cl. ......................... 60/782; 60/39.83; 60/806; 415/115; 416/97 R
(58) Field of Search ............................... 60/39.83, 782, 60/806; 415/115; 416/96 R, 96 A, 97 R

(56) References Cited

U.S. PATENT DOCUMENTS

| | | |
|---|---|---|
| 5,392,515 A | 2/1995 | Auxier et al. |
| 5,498,133 A | 3/1996 | Lee |
| 5,611,197 A | 3/1997 | Bunker |
| 5,782,076 A * | 7/1998 | Huber et al. ............... 415/115 |
| 6,065,282 A * | 5/2000 | Fukue et al. ................ 415/115 |
| 6,253,554 B1 * | 7/2001 | Kobayashi et al. ........... 60/736 |

FOREIGN PATENT DOCUMENTS

| | | |
|---|---|---|
| DE | 197 37 845 A1 | 3/1999 |
| EP | 0 899 425 | 3/1999 |
| WO | WO 99/47798 | 9/1999 |

* cited by examiner

Primary Examiner—Charles G. Freay
(74) Attorney, Agent, or Firm—Burns, Doane, Swecker & Mathis, L.L.P.

(57) ABSTRACT

A gas turbine system comprises a compressor that takes in suction air on the inlet side and compresses it to compressor end air that is available on the outlet side, a combustor in which a fuel is burned by using the compressor end air while resulting in the formation of hot gas, as well as a turbine in which the hot gas is expanded while providing work output. In a method for cooling this gas turbine system, compressed air is removed from the compressor, is fed as cooling air for cooling inside an internal cooling channel through thermally loaded components of the combustor and/or the turbine, is then recooled and subsequently compressed and added to the compressor end air. The influence of the cooling on the efficiency of the system is minimized by the fact that at least part of the compressor end air is used to recool the cooling air.

23 Claims, 4 Drawing Sheets

METHOD FOR COOLING A GAS TURBINE SYSTEM AND A GAS TURBINE SYSTEM FOR PERFORMING THIS METHOD

FIELD OF THE INVENTION

This invention relates to the field of gas turbines, and more particularly to methods and apparatus for cooling

BACKGROUND OF THE INVENTION

In order to cool their hot parts, in particular the combustor and the turbine through which the hot gas flows, existing gas turbines (gas turbine systems) use either cooling media taken from the compressor at a suitable pressure-and which sometimes are further cooled-and which, after they have been used to cool the hot parts, are added to the turbine stream; or these existing gas turbines use closed cooling circuits supplied from an external cooling medium source, in most cases water or steam. Such a method and such a gas turbine system are known, for example, from publication U.S. Pat. No. 5,611,197. In the latter case, frequently found in combination power plants, the cooling heat often can be used in the process that follows. Another possibility, described, for example, in EP-A2-0 899 425 of the applicant, combines, especially in the case of blade cooling, a closed steam cooling system in the main part of the blade with an open cooling system in the area of the leading blade edge.

The first category has the disadvantage that the cooling medium, which inherently bypasses heating in the combustor, in most cases undergoes a higher pressure loss in the cooling section than is necessary for the cooling task. In addition, mixing losses are created when the cooling medium enters the main stream. Both represent significant process losses that have an important adverse effect on the efficiency of the process overall.

The second category of externally supplied cooling systems and, in particular, also the third category of the combined cooling systems, does not have these disadvantages or is only affected by them to a limited degree; however, their operation becomes dependent on an external coolant supply, which is associated with an increased level of complexity as well as increased cost and safety risks.

The initially mentioned U.S. Pat. No. 5,611,197 discloses a gas turbine with a closed cooling system for the guide and rotating blades and the hot gas housing of the turbine, in which air with a specific pressure is removed from the compressor at an intermediate pressure level or at the outlet, this air is supplied as cooling air through the components to be cooled, and is then again fed into the compressor at a suitable, lower pressure level. Prior to being fed into the compressor, the returned cooling air hereby also can be additionally cooled inside a cooler.

This known type of closed cooling circuit has significant advantages in terms of simplicity of design and operation and influence on the overall efficiency when compared to the types of cooling described previously in this document. The disadvantage is, however, that in the case of a recooling of the cooling air, external cooling media (52 in the figure of U.S. Pat. No. 5,611,197) are used to cool down the returned cooling air in a heat exchanger (50). The heat removed in the heat exchanger in this way is removed in an efficiency-reducing manner from the process of the gas turbine system and at most can be utilized with additional expenditure.

SUMMARY OF THE INVENTION

It is therefore the objective of the invention to disclose a cooling method for a gas turbine as well as a gas turbine system for performing said method that avoids the disadvantages of known methods of gas turbine systems and is characterized, in particular, by a simple and substantially efficiency-neutral recooling.

The concept of the invention is to perform at least a substantial part of the recooling with at least one part of the compressor end air as a cooling medium. The heat removed from the cooling air in this way is easily returned into the process of the gas turbine system. The recooling of the cooling air with the compressor end air is hereby preferably performed in a heat exchanger, in particular, in a counter-current heat exchanger.

According to a first preferred embodiment of the method according to the invention, the cooling air is passed in a completely closed cooling circuit through the components to be cooled. This ensures that no compressed air passes by the combustor in an efficiency-reducing manner and reaches the main stream.

A second preferred embodiment is characterized in that a part of the cooling air is fed for film cooling through drilled film cooling openings on the components, in the manner of a targeted leakage, into the turbine stream. This makes it possible to achieve a very effective additional film cooling of the exterior surfaces of the components to be cooled with only slight losses of compressed air.

The thermally loaded components cooled with the cooling air preferably include the walls of the transition areas combustor/gas turbine and/or housing parts of the turbine and/or rotor parts of the turbine and/or blades of the turbine. If the blades of the turbine are cooled with cooling air, it is particularly effective if drilled film cooling openings are provided on the leading blade edges and/or the trailing blade edges.

If a pressure loss occurs in the cooling air during the cooling process, the cooling air must be recompressed after the cooling process. It is preferred that the compressor of the gas turbine system itself is used to recompress the cooling air after the cooling process, or an external compressor is used.

If the recooling in the heat exchanger with the compressor end air is insufficient, a further aftercooling of the cooling air is performed after the recooling with the compressor end air, for which preferably a cooler through which a separate cooling medium flows is used. However, it would also be conceivable and reasonable to inject water directly into the cooling air in order to aftercool the cooling air.

A preferred embodiment of the gas turbine system according to the invention has second cooling lines that merge into the compressor at an intermediate pressure level. It would also be conceivable, however, that instead of this, an external compressor is located in the second cooling lines, and that the second cooling lines merge into the outlet of the compressor of the gas turbine system.

BRIEF DESCRIPTION OF THE DRAWINGS

The invention will be described below in reference to the drawings, wherein.

DESCRIPTION OF THE INVENTION

Figure 1:
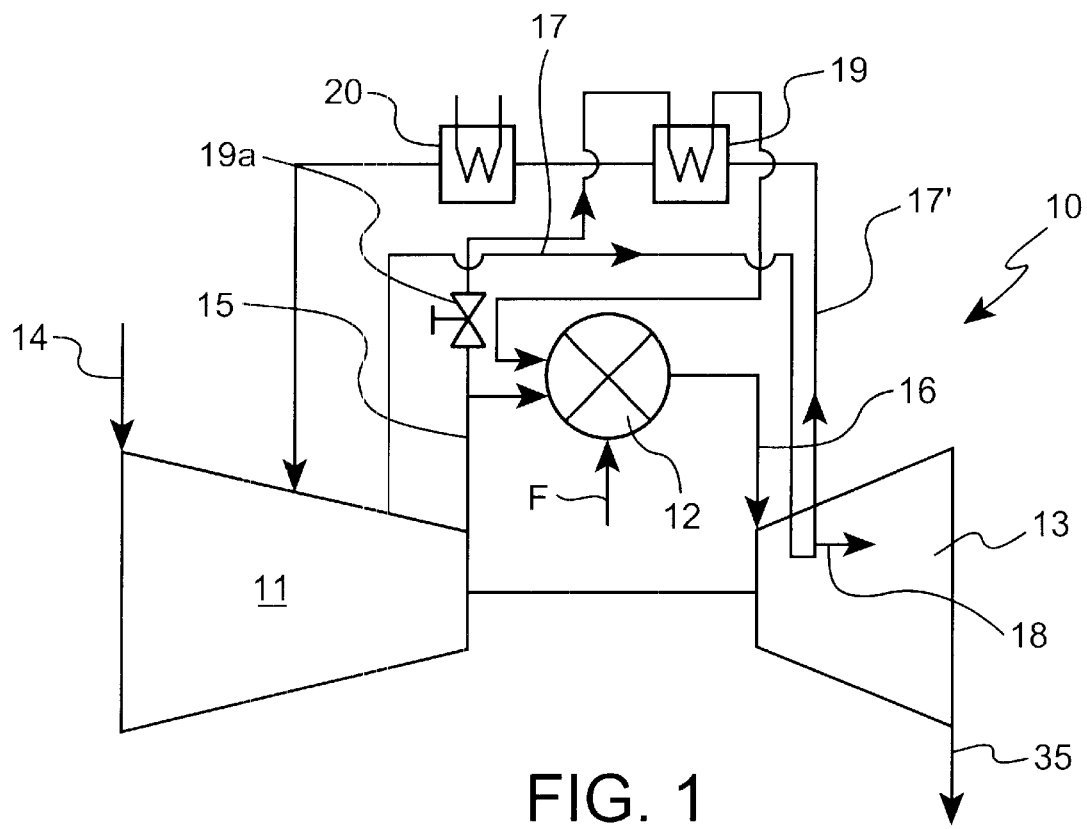
FIG. 1 is a greatly simplified schematic diagram of a gas turbine system according to a first embodiment of the invention.

FIG. 1 shows a greatly simplified system schematic of a gas turbine system according to a first embodiment of the invention with a cooling circuit. The gas turbine system 10 comprises a (usually multi-stage) compressor 11, a combustor 12, and a (usually multi-stage) turbine 13. Compressor 11 and turbine 13 are provided with corresponding rows of blades arranged on a common rotor. The compressor 11 takes in suction air 14 on the inlet side, compresses it, and outputs it on the outlet side in the form of compressor end air 15 to the combustor 12, where it is used as combustion air for burning a (liquid or gaseous) fuel F. The hot gas 16 created during combustion is expanded in the downstream turbine 13 while providing work output, and is then passed on in the form of waste gas 35 to a chimney or—in a combination power plant—to downstream waste heat steam generator.

Inside the turbine 13 are provided—surrounded by a hot gas housing—various rows of guide and rotating blades that are exposed to the hot gas 16 coming from the combustor 12, whereby the closer the blades and housing parts are located relative to the inlet of the turbine 13, the greater the thermal load on said blades and housing parts. Given the high hot gas temperatures required for good efficiency, these thermally severely loaded components must be cooled in order to achieve a sufficient life span.

According to the invention, the thermally loaded components are then cooled with cooling air removed from the compressor 11 at a predetermined pressure level, are fed via a first cooling line 17 to the component to be cooled, are used for cooling there, and are then returned for the most part via a second cooling line 17' to the compressor 11 and fed into it again at a lower pressure level. This type of return makes it possible for the compressor 11 to compensate for the pressure loss created during the cooling process. The cooling air, therefore, completely or at least for the most part, takes part in the combustion process as combustion air and therefore results only in small efficiency losses. The cooling of the thermally loaded components is exclusively or substantially an internal cooling, whereby the cooling air flows through cooling channels inside the components. This results in a completely or substantially closed cooling circuit.

The cooling circuit is not completely closed if an additional external cooling, in the form of a film cooling, is provided or if intentional or unintentional leakages do occur. For this purpose, for example, outflow openings (drilled film cooling openings) are provided on the component to be cooled, through which openings a part of the circulating cooling air flows to the outside in the form of leakage air 18 and forms a cooling film on the hot gas-loaded external surface of the component. The content of leakage air 18 is hereby selected so that on the one hand the overall efficiency of the system is only slightly reduced, while on the other hand an effective film cooling is achieved. The leakage air 18 that flows into the turbine stream and therefore can no longer be passed through the combustor 12 is symbolized in FIG. 1 by small arrows 18 extending from the cooling circuit outward.

Figure 7:
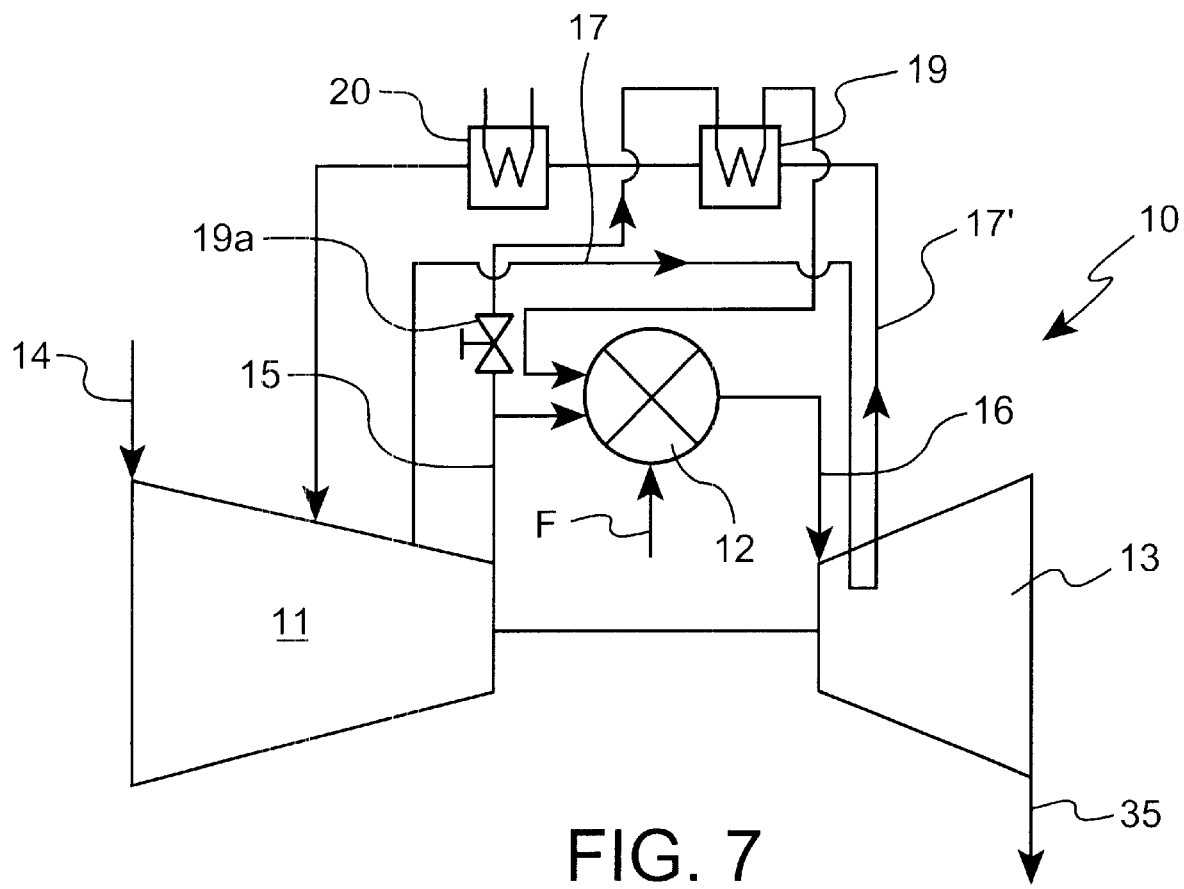
FIG. 7 is a schematic diagram of a gas turbine system according to the first embodiment of the invention shown in FIG. 1, but without the presence of any leakage air so as to form a completely closed cooling circuit. gas housing of the turbine are cooled.

FIG. 7 shows a schematic of a gas turbine system according to the first embodiment of the invention as described above, but with a completely closed cooling circuit as a result of the absence of any leakage air 18.3

According to the invention, the heat absorbed by the cooling air during the cooling process then can be removed again from the cooling air and returned into the process, prior to being returned into the compressor 11, in that, for the recooling, a heat exchanger 19, preferably a counter-stream heat exchanger, through which at least part of the compressor end air 15 flows, is provided in the second cooling line 17'. The portion of compressor end air 15 that is supposed to absorb heat in the heat exchanger 19 can be adjusted with a control valve 19a. If a further aftercooling is needed, an additional cooler 20 that works with a separate cooling medium, for example, water or steam, is provided downstream from the heat exchanger 19.

The aftercooling with the cooler 20 at the same time can be used in the manner of an intermediate cooler to reduce the temperature of the air compressed in the compressor 11. If the cooling air in the cooler 20 is recooled significantly more than would correspond to the heat uptake during the cooling process, the compressor end temperature, i.e., the temperature of the compressor end air 15, can be lowered, which enables an increase in the pressure ratio and therefore an increase in the efficiency.

Figure 2:
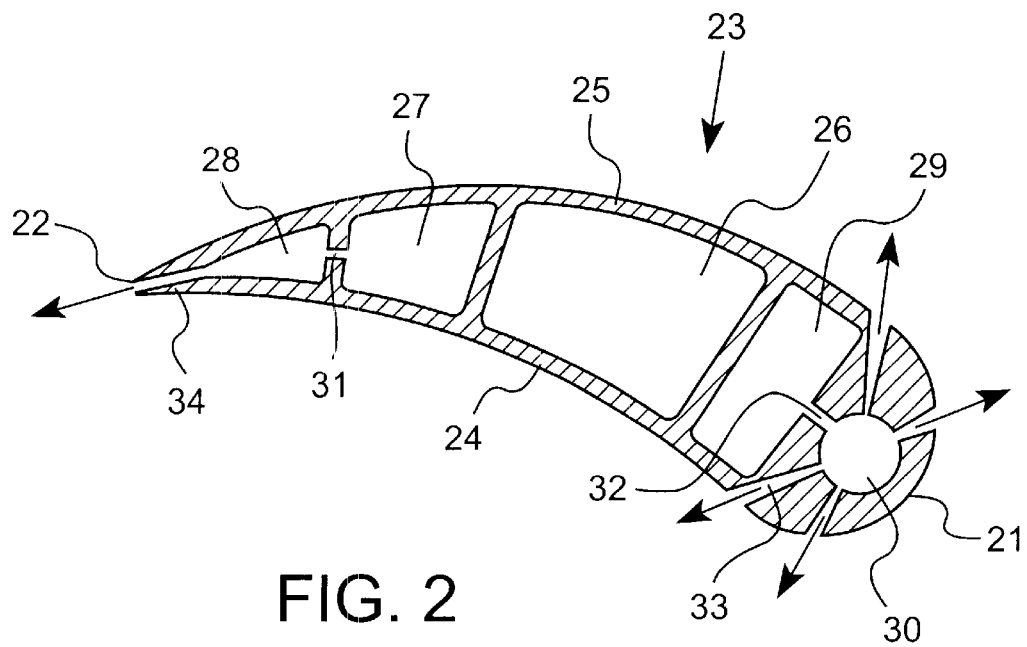
FIG. 2 is a cross-sectional view through a blade with film cooling at the leading blade edge and trailing blade edge, as may be connected to a cooling circuit according to FIG. 1.

If the component to be cooled is a blade or row of blades of the turbine 13, the leakage air 18—if the cooling circuit is not completely closed—is preferably used to cool the leading blade edges and/or trailing blade edges of the blade(s) by film cooling. A cross-section of an exemplary blade 23 suitable for this purpose is shown in FIG. 2. The blade 23 has a pressure-side blade wall 24 and a suction-side blade wall 25 that both merge at the leading blade edge 21 and the trailing blade edge 22. Inside the blade 23—separated by support walls from each other-various cooling channels 26, . . . , 30 that extend in axial direction of the blade 23 (i.e., vertical to the drawing plane) are provided; the cooling air flows through these cooling channels in alternating direction (see, for example, EP-A2-0 899 425). From the cooling channels 28 and 30 located in the area of the edges 21, 22, drilled film cooling openings 33 or 34, through which the leakage air 18 is able to flow out and form a cooling film on the outside, extend towards the outside (also see, for example, US-A-5,498,133). The cooling channels 28, 30 are hereby supplied with cooling air from the adjoining cooling channels 27, 29 via connecting channels 31, 32.

Figure 3:
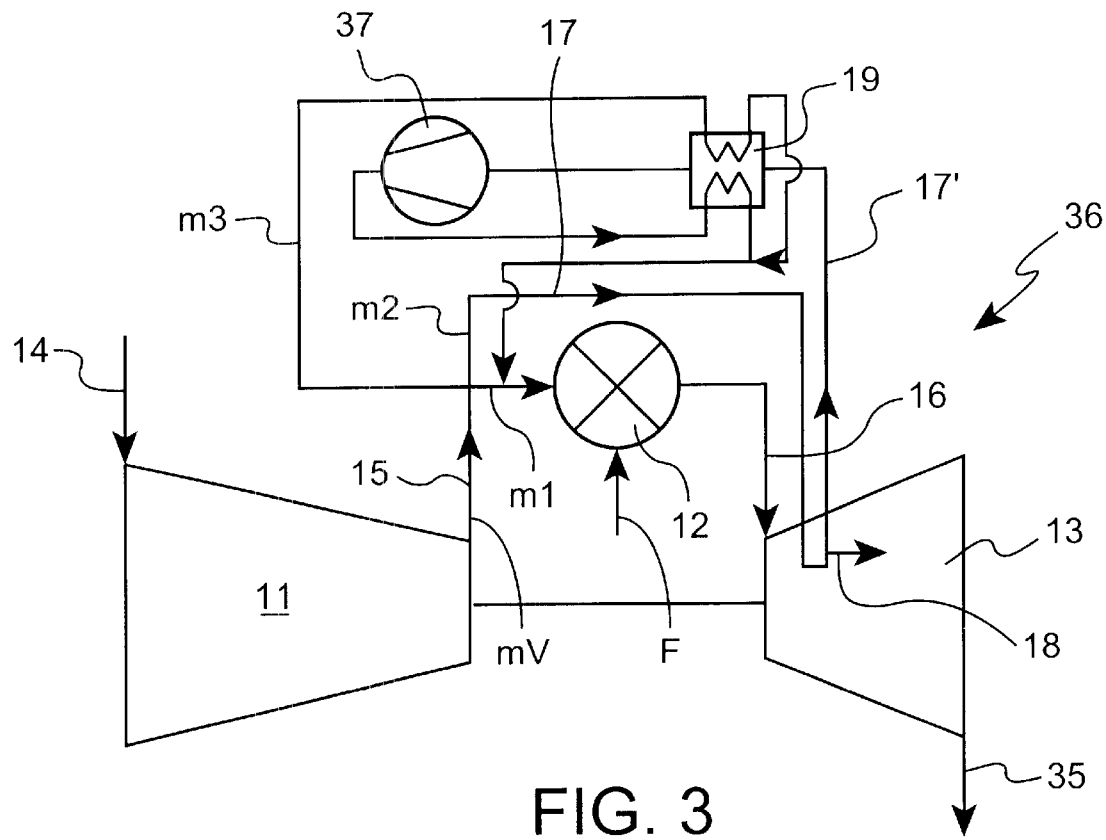
FIG. 3 is a schematic diagram of a gas turbine system according to a second embodiment of the invention with recompression of the cooling air by an external compressor.

Based on the basic schematic of the cooling system according to the invention as shown in FIG. 1, different variations that are adapted to different applications and thus have specific advantages can be realized. In the exemplary embodiment of a gas turbine system 36 shown in FIG. 3, one of these variations is realized. In the cooling circuit shown here, formed by cooling lines 17 and 17', the compressor end air 15 with the compressor end mass stream mv is divided into three partial streams with the mass streams m1, m2, and m3, whereby mv =m1 +m2 +m3, and each one of the partial mass streams is ≧0. The first partial mass stream ml reaches the combustor 12 directly. The second partial mass stream m2 flows through the cooling lines 17 and 17' and the heat exchanger 19 in order to cool the turbine 13 and is then recompressed by an external compressor 37. The third partial mass stream m3 and the recompressed second partial mass stream m2 flow in counter-current through the heat exchanger 19, and these two mass streams are combined downstream from the heat exchanger and fed together with the first partial mass stream ml to the combustor 12. The necessary recompression after passing through the heat exchanger 19 is therefore performed not in the compressor 11 of the gas turbine system 35, but rather in the external compressor 37. Here also an additional cooler can be provided for aftercooling. If the cooling air in this arrangement is brought by the external compressor 37 to a pressure that is higher than the pressure of the compressor end air 15, it is possible and advantageous to use the compressed cooling air for a showerhead cooling in a first turbine stage of the turbine 13. It is, however, also conceivable and reasonable to use a partial mass stream, such as m2, to cool parts of the combustor, as is explained in more detail below for a comparable solution in reference to FIG. 6.

Figure 4:
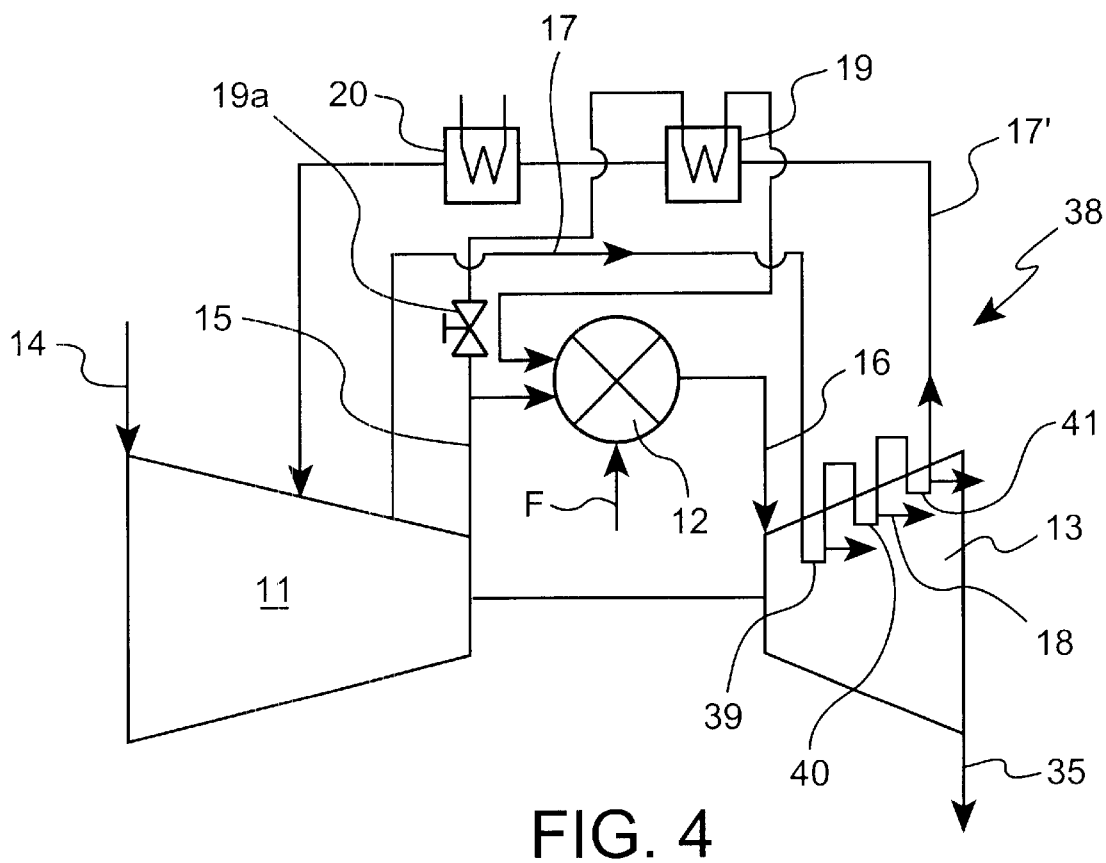
FIG. 4 is a schematic diagram of a gas turbine system according to a third embodiment of the invention with successive cooling of several rows of blades in the turbine.

FIG. 4 shows another embodiment of the cooling system according to the invention. The cooling circuit of the gas turbine system 38 with cooling lines 17 and 17' in this example is used not only for a single row of blades of the turbine 13, but for several rows of blades 39, 40, and 41, through which the cooling air flows sequentially. In each of the rows of blades 39, . . . , 41, leakage air 18 again can flow into the main stream of the turbine 13 in order to film-cool the edges.

Figure 5:
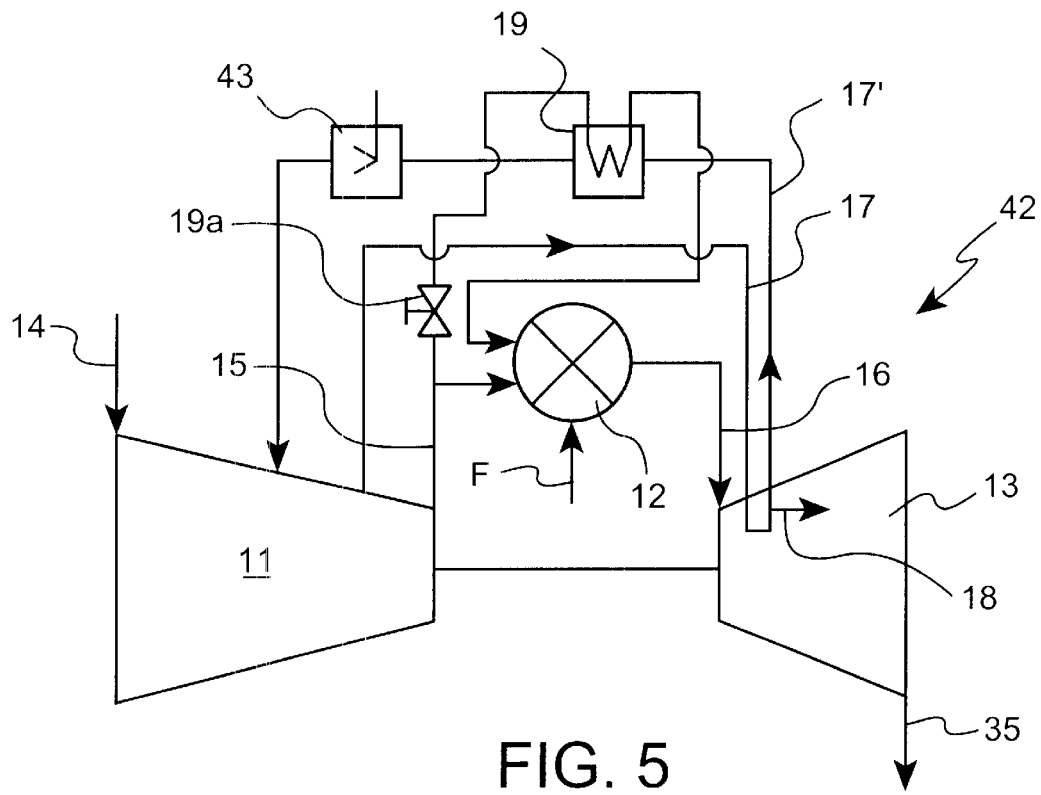
FIG. 5 is a schematic diagram of a gas turbine system according to a fourth embodiment of the invention, in which the aftercooling of the cooling air is effected by injecting water.

Another possibility for aftercooling is shown in the embodiment in FIG. 5. In the gas turbine system 42 of this figure, an injection device 43 is inserted into the cooling circuit with the cooling lines 17, 17' downstream from the heat exchanger 19 for aftercooling. Analogously to a type of "quench cooling", water is injected here into the cooling air. The temperature reduction of the cooling air that can be achieved with this is preferably designed so that the temperature of the mixed gas is reduced after the recooled cooling air is mixed with the main air flowing through the compressor 11. As already mentioned above, this makes it possible to increase the system's efficiency.

Figure 6:
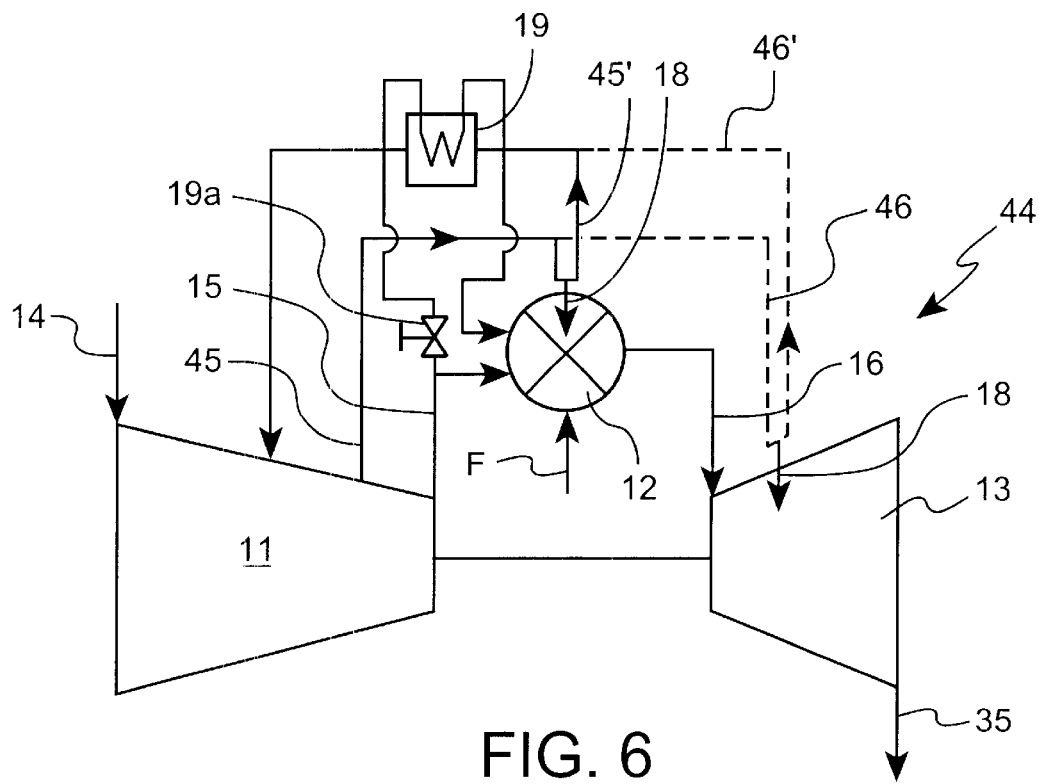
FIG. 6 is a schematic diagram of a gas turbine system according to a fifth embodiment of the invention, in which the walls of the combustor and/or the hot

Finally, according to FIG. 6, it is possible within the scope of this invention that in a gas turbine system 44, instead of or in addition to the blades of the turbine 13, other components of the system with high thermal loads are cooled with air in the closed circuit. In FIG. 6, for example, the cooling circuit with cooling lines 45, 45' and the heat exchanger 19 is designed for cooling the walls of the combustion chamber 12 or the combustion chamber liners by way of an internal cooling air circulation and external film cooling with leakage air 18. Another cooling circuit (drawn with broken lines) with cooling lines 46, 46' ensures an internal and, if needed, external cooling of the hot gas housing of the turbine 13, in particular in the inlet area of the hot gasses.

Overall, the invention provides an effective cooling of the thermally loaded components of a gas turbine system, which is simple in its design and operation, can be used flexibly, and has only minor effects on the overall efficiency of the system.

What is claimed is:

1. A method for cooling a gas turbine system comprising a compressor that takes in suction air on the inlet side and compresses it to compressor end air that is available on the outlet side, a combustor in which a fuel is burned by using the compressor end air while resulting in the formation of hot gas, as well as a turbine in which the hot gas is expanded while providing work output, in which process compressed air is removed from the compressor is fed as cooling air for cooling inside an internal cooling channel through thermally loaded components of the combustor and/or the turbine, is then recooled, compressed, and finally added to the compressor end air, wherein at least part of the compressor end air is used for recooling the cooling air.

2. The method as claimed in claim 1, wherein the recooling of the cooling air is performed with the compressor end air in a heat exchanger.

3. The method as claimed in claim 1, wherein the cooling air is passed in a completely closed cooling circuit through the components.

4. The method as claimed in claim 1, wherein a part of the cooling air is fed into the turbine stream for film cooling through drilled film cooling openings on the components in the manner of a targeted leakage.

5. The method as claimed in claim 1, wherein the thermally loaded components cooled with the cooling air include the transition areas from the combustor to the turbine and/or housing parts of the turbine and/or rotor parts of the turbine and/or blades of the turbine.

6. The method as claimed in claim 5, wherein the blades of the turbine are cooled with the cooling air, and wherein the drilled film cooling openings are located on the blades, on one of the leading blade edges and the trailing blade edges, or both.

7. The method as claimed in claim 5, wherein the turbine includes a plurality of rows of blades, and wherein the cooling air successively flows through the rows of blades.

8. The method as claimed in claim 1, wherein the compressor of the gas turbine system itself is used for compressing the cooling air after the cooling process.

9. The method as claimed in claim 1, wherein an external compressor is used to compress the cooling air after the cooling process.

10. The method as claimed in claim 9, wherein the cooling air is compressed by the external compressor to a pressure that is higher than the pressure of the compressor end air, and wherein the compressed cooling air is used for a showerhead cooling in a first turbine stage of the turbine.

11. The method as claimed in claim 1, wherein an additional aftercooling of the cooling air is performed after the recooling with the compressor end air.

12. The method as claimed in claim 11, wherein a cooler through which a separate cooling medium is used for aftercooling.

13. The method as claimed in claim 11, wherein water is injected directly into the cooling air in order to aftercool the cooling air.

14. The method as claimed in claim 1, wherein the mass stream of the compressor end air is divided into several partial mass streams, including a partial mass stream that is passed directly into the combustor, and wherein another partial mass stream is used as cooling air, and wherein another partial mass stream is used for recooling the cooling air.

15. The method as claimed in claim 2, wherein the heat exchanger is a counter-current heat exchanger.

16. The method as claimed in claim 12, wherein the cooling medium is steam that can be used by a combination process.

17. Apparatus for cooling a gas turbine system comprising: a compressor that takes in suction air on the inlet side and compresses it to compressor end air that is available on the outlet side, a combustor in which a fuel is burned by using the compressor end air while resulting in the formation of hot gas, as well as a turbine in which the hot gas is expanded while providing work output, whereby, in order to cool thermally loaded components of the combustor and/or the turbine, first cooling lines from the compressor and/or the outlet of the compressor to components and second cooling lines from the components back to the compressor and/or the outlet of the compressor are provided, and including a heat exchanger, through which at least one part of the compressor end air flows, which is inserted into the second cooling lines.

18. Apparatus for cooling a gas turbine system as claimed in claim 17, wherein the second cooling lines merge into the compressor at an intermediate pressure level.

19. Apparatus for cooling a gas turbine system as claimed in claim 17, wherein an external compressor is located in the second cooling lines, and wherein the second cooling lines merge into the outlet of the compressor of the gas turbine system.

20. Apparatus for cooling a gas turbine system as claimed in claim 17, wherein a cooler operated with a separate cooling medium is located in the second cooling lines downstream from the heat exchanger.

21. Apparatus for cooling a gas turbine system as claimed in claim 17, wherein an injection device for injecting water into the cooling air is located in the second cooling lines downstream from the heat exchanger.

22. Apparatus for cooling a gas turbine system as claimed in claim 17, wherein the components to be cooled are provided with one of drilled film cooling openings and sealing gaps, or both, that communicate with the first and second cooling lines.

23. Apparatus for cooling a gas turbine system as claimed in claim 22, wherein the cooled components include blades of the turbine, wherein drilled film cooling openings are provided, and wherein the drilled film cooling openings are located on one of the leading blade edges and the trailing blade edges, or both.

* * * * *